(12) United States Patent
Thaler et al.

(10) Patent No.: US 11,444,916 B2
(45) Date of Patent: Sep. 13, 2022

(54) DYNAMIC LOCAL MEDIA ACCESS CONTROL (MAC) ADDRESS ASSIGNMENT

(71) Applicant: Avago Technologies International Sales Pte. Limited, Singapore (SG)

(72) Inventors: Patricia Ann Thaler, Carmichael, CA (US); Michael David Johas Teener, Santa Cruz, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 16/938,809

(22) Filed: Jul. 24, 2020

(65) Prior Publication Data

US 2020/0358741 A1  Nov. 12, 2020

Related U.S. Application Data

(62) Division of application No. 15/867,434, filed on Jan. 10, 2018, now Pat. No. 10,728,210, which is a division of application No. 14/749,549, filed on Jun. 24, 2015, now Pat. No. 9,900,283.

(60) Provisional application No. 62/017,197, filed on Jun. 25, 2014.

(51) Int. Cl.
| | |
|---|---|
| *H04L 61/5046* | (2022.01) |
| *H04L 61/5038* | (2022.01) |
| *H04L 61/5092* | (2022.01) |
| *H04L 101/622* | (2022.01) |

(52) U.S. Cl.
CPC ...... *H04L 61/5046* (2022.05); *H04L 61/5038* (2022.05); *H04L 61/5092* (2022.05); *H04L 2101/622* (2022.05)

(58) Field of Classification Search
None
See application file for complete search history.

(56) References Cited

U.S. PATENT DOCUMENTS

| | | |
|---|---|---|
| 5,835,725 A | 11/1998 | Chiang |
| 6,895,004 B1 | 5/2005 | Freeman |
| 7,529,851 B1 | 5/2009 | Haley et al. |
| 2002/0118412 A1 | 8/2002 | Gibson |
| 2005/0254489 A1 | 11/2005 | Jain et al. |
| 2007/0073882 A1* | 3/2007 | Brown ............. H04L 29/12066 709/226 |

(Continued)

FOREIGN PATENT DOCUMENTS

EP           2600573      *  6/2013

*Primary Examiner* — Mohammad S Adhami
(74) *Attorney, Agent, or Firm* — BakerHostetler

(57) ABSTRACT

A device implementing a dynamic local media access control (MAC) address assignment system may include at least one processor that is configured to initiate a link establishment with a network device. The at least one processor may be further configured to determine whether a previously assigned media access control (MAC) address is stored locally. The at least one processor may be further configured to transmit a message to the network device requesting validation of the previously assigned MAC address when stored locally. The at least one processor may be further configured to communicate using the previously assigned MAC address when the validation is received from the network device, otherwise communicating using a dynamically assigned MAC address received from the network device during the link establishment.

20 Claims, 5 Drawing Sheets

(56) References Cited

U.S. PATENT DOCUMENTS

| | | |
|---|---|---|
| 2007/0121518 A1* | 5/2007 | Arunachalam ..... H04L 43/0811 |
| | | 370/249 |
| 2010/0122098 A1 | 5/2010 | Kay |
| 2010/0318666 A1 | 12/2010 | Gallagher |
| 2011/0066756 A1 | 3/2011 | Kakumaru |
| 2011/0135303 A1* | 6/2011 | Hufferd ................... H04L 49/30 |
| | | 398/45 |
| 2013/0155933 A1* | 6/2013 | Kneckt ................... H04L 43/12 |
| | | 370/312 |
| 2014/0025821 A1 | 1/2014 | Baphna |
| 2014/0040440 A1* | 2/2014 | Christopher ........ H04L 61/6022 |
| | | 709/220 |
| 2014/0064185 A1 | 3/2014 | Abraham et al. |

* cited by examiner

DYNAMIC LOCAL MEDIA ACCESS CONTROL (MAC) ADDRESS ASSIGNMENT

CROSS-REFERENCE TO RELATED APPLICATIONS

The present application is a divisional of U.S. patent application Ser. No. 15/867,434, entitled "Dynamic Local Media Access Control (MAC) Address Assignment," filed on Jan. 10, 2018, which is a divisional of U.S. patent application Ser. No. 14/749,549, entitled "Dynamic Local Media Access Control (MAC) Address Assignment," filed on Jun. 24, 2015, which claims the benefit of U.S. Provisional Patent Application Ser. No. 62/017,197, entitled "Configuring Devices without Global Media Access Control (MAC) Addresses," filed on Jun. 25, 2014, each of which is hereby incorporated by reference in its entirety for all purposes.

TECHNICAL FIELD

The present description relates generally to media access control (MAC) address assignment, including dynamic local MAC address assignment.

BACKGROUND

According to some estimates, more than 30 billion devices will be capable of being connected by 2020. These devices may include sensor devices, automotive devices, wearable devices, computing devices, and the like. The devices may be configurable to communicate with one or more other devices, such as to collectively perform one or more tasks, e.g. on behalf of a user and/or an application. The devices may each be assigned a 48-bit MAC address, such as at the time of manufacture, to facilitate communications between the devices.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

The subject dynamic local MAC address assignment system allows locally unique MAC addresses to be assigned dynamically, e.g. on-demand, when devices are powered on and ready to utilize a MAC address, rather than (or in addition to) assigning MAC addresses to devices at the time of manufacture. In this manner, the subject system can reassign locally unique MAC addresses to devices, thereby reducing consumption of local MAC address space particularly by the increasing number of small or transient devices and by ports of virtual machines. Thus, the subject system significantly improves the utilization of MAC addresses, e.g. by only assigning MAC addresses that are unique on the local network to devices and allowing devices on other networks to reuse that pool of locally unique MAC addresses rather than assigning globally unique addresses, thereby extending the of the longevity of the 48-bit MAC address assignment system.

Figure 1:
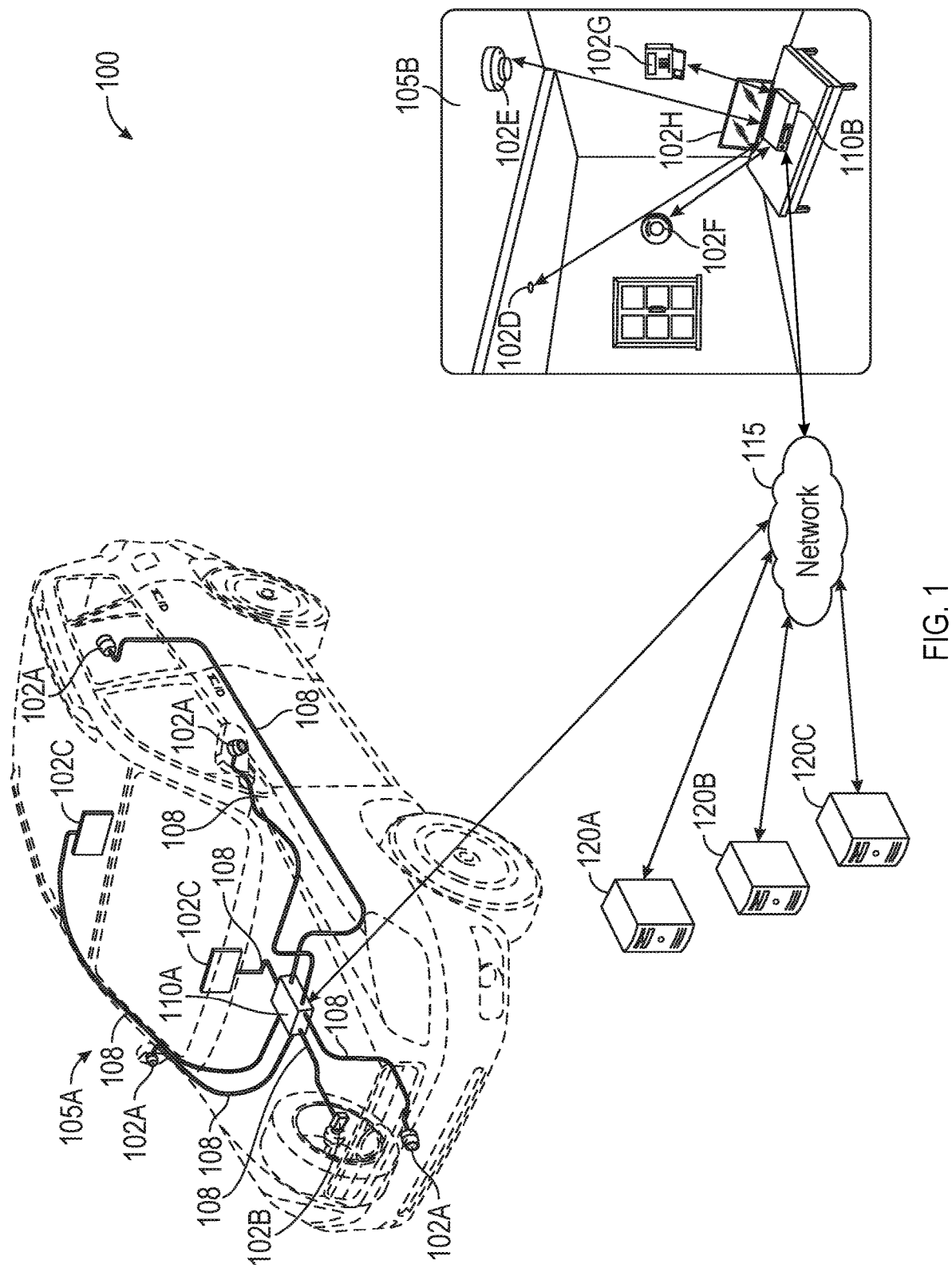
FIG. 1 illustrates an example network environment in which dynamic local MAC address assignment may be implemented in accordance with one or more implementations.

FIG. 1 illustrates an example network environment 100 in which dynamic local MAC address assignment may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a vehicle network environment 105A, a home network environment 105B, a network 115, and one or more servers 120A-C. The network 115 may be a public communication network (such as the Internet, cellular data network, dialup modems over a telephone network) or a private communications network (such as private local area network ("LAN"), leased lines). The one or more servers 120A-C may each be a single computing device such as a computer server. In another example, each of the one or more servers 120A-C may represent one or more computing devices (such as a cloud of computers and/or a distributed system) that are communicatively coupled, such as communicatively coupled over the network 115, that collectively, or individually, perform one or more functions that can be performed server-side, such as coordinating dynamic MAC address assignment. One or more of the servers 120A-C may be geographically separated.

The vehicle network environment 105A includes a number of electronic devices 102A-C that are coupled to a network device 110A via the transmission lines 108. The network device 110A may communicably couple the electronic devices 102A-C to one another. One or more of the electronic devices 102A-C may be communicatively coupled directly to one another, such as without the support of the network device 110A. The transmission lines 108 are Ethernet transmission lines, such as one or more twisted pair of wires. The network device 110A may be, or may include, a switch device, a bridge device, a routing device, a hub device, or generally any device that may communicably couple the electronic devices 102A-C. One or more of the electronic devices 102A-C and/or the network device 110A may include, or may be, the electronic system 500 of FIG. 5.

In the vehicle network environment 105A, the electronic devices 102A-C may include, or may be coupled to, various systems within a vehicle, such as a powertrain system, a chassis system, a telematics system, an entertainment system, a camera system, a sensor system, such as a lane departure system, a diagnostics system, or generally any system that may be used in a vehicle. In FIG. 1, the electronic devices 102A are depicted as camera devices, such as forward-view, rear-view and side-view cameras, the electronic device 102B is depicted as an on-board diagnostics system, and the electronic devices 102C are depicted as entertainment systems. The network device 110A is communicably coupled to a network 115, such as the Internet. For example, the network device 110A may be communicably coupled to the network 115 via a cellular communication link, such as a long-term evolution (LTE) link.

The home network environment 105B includes a number of electronic devices 102D-H that are coupled to a network device 110B. The network device 110B may communicably couple the electronic devices 102D-H to one another. In one or more implementations, one or more of the electronic devices 102D-H may be communicatively coupled directly to one another, such as without the support of the network device 110B. The network device 110B may be, or may include, a switch device, a bridge device, a routing device, a hub device, or generally any device that may communicably couple the electronic devices 102D-H. One or more of the electronic devices 102D-H and/or the network device 110B may include, or may be, the electronic system 500 of FIG. 5.

The network device 110B and/or one or more of the electronic devices 102D-H may include one or more communication modules for establishing network connections, and/or for dynamic assignment of MAC addresses, via one or more wired and/or wireless networking technologies. The one or more networking technologies may include, for example, Bluetooth, Zigbee, WiFi, infra-red, WiFi Direct, Ethernet, powerline, coaxial, or generally any wireless or wired communication technologies. The network device 110B is a gateway device may communicatively couples the electronic devices 102D-H with the network 115, such as the Internet.

In the home network environment 105B of FIG. 1, the electronic device 102D is depicted as a lighting device, the electronic device 102E is depicted as a smoke detector device, the electronic device 102F is depicted as a thermostat device, the electronic device 102G is depicted as a security device, the electronic device 102H is depicted as a television device, and the network device 110B is depicted as a set-top box device.

The electronic devices 102A-H and the network devices 110A-B may implement a physical layer (PHY) that is interoperable with one or more aspects of one or more physical layer specifications, such as those described in the Institute of Electrical and Electronics Engineers (IEEE) 802.3 Standards. The electronic devices 102A-H and the network devices 110A-B may be assigned and/or associated with addresses, e.g. 48-bit MAC addresses and/or other layer 2 addresses, that are used to identify the electronic devices 102A-H and the network devices 110A-B, e.g. when communicating with one another, such as directly and/or over the network 115.

One or more of the electronic devices 102A-H and/or the network devices 110A-B may be assigned a global MAC address at the time of manufacture and/or one or more of the electronic devices 102A-H and/or the network devices 110A-B may be dynamically assigned a local MAC address, as is discussed further below with respect to FIGS. 2-4. In one or more implementations, one or more of the electronic devices 102A-H that are assigned a global MAC address at the time of manufacture may also be dynamically assigned a local MAC address. In this instance, the one or more electronic devices 102A-H may utilize the dynamically assigned local MAC address rather than the global MAC address that was assigned at the time of manufacture.

The servers 120A-C and/or the network devices 110A-B, either of which may be referred to as address distributing devices and/or address distributors, may each coordinate the assignment of separate non-overlapping blocks of local MAC addresses to the electronic devices 102A-H. The servers 120A-C and/or the network devices 110A-B may also discover each other and cooperatively interoperate to divide the local MAC addresses that are available for assignment to the electronic devices 102A-H.

For example, one or more of the electronic devices 102A-H may be dynamically assigned a local MAC address by one of the network devices 110A-B during link establishment, as is discussed further below with respect to FIG. 2. Alternatively, and/or in addition, one or more of the electronic devices 102A-H and/or the network devices 110A-B may be dynamically assigned a local MAC address by one or more of the servers 120A-C, as is discussed further below with respect to FIG. 3. Furthermore, one or more of the electronic devices 102A-H may claim and self-assign a local MAC address, as is discussed further below with respect to FIG. 4.

In one or more implementations, the example network environment 100 may also include one or more personal area networks, medical networks, and/or industrial networks that include manufacturing equipment, e.g. networks within a machine and/or networks between machines, and the like. For example, in an industrial network example devices may include sensors, such as thermometers, pressure sensors, position sensors, actuators (e.g. motors, heaters, valves, etc.), cameras, controllers, and the like. In one or more implementations, the electronic devices 102A-H may be a system on a chip (or a module containing one or a small number of chips and sensors and/or actuators), and/or one or more of the electronic devices 102A-H may not include an input or output device interface, e.g. one or more of the electronic devices 102A-H may just include a temperature or pressure sensor, or an output to drive a solenoid or stepper motor, and/or a camera device for input. One or more of the electronic devices 102A-H may be a thermostat, a light bulb which receives instructions on the amount of light to put out and when to turn on or off, e.g. any other input and/or output may occur over the network connection, and/or a medical sensor, e.g. in a pill that is swallowed and outputs data through a wireless connection on conditions in the digestive track.

Figure 2:
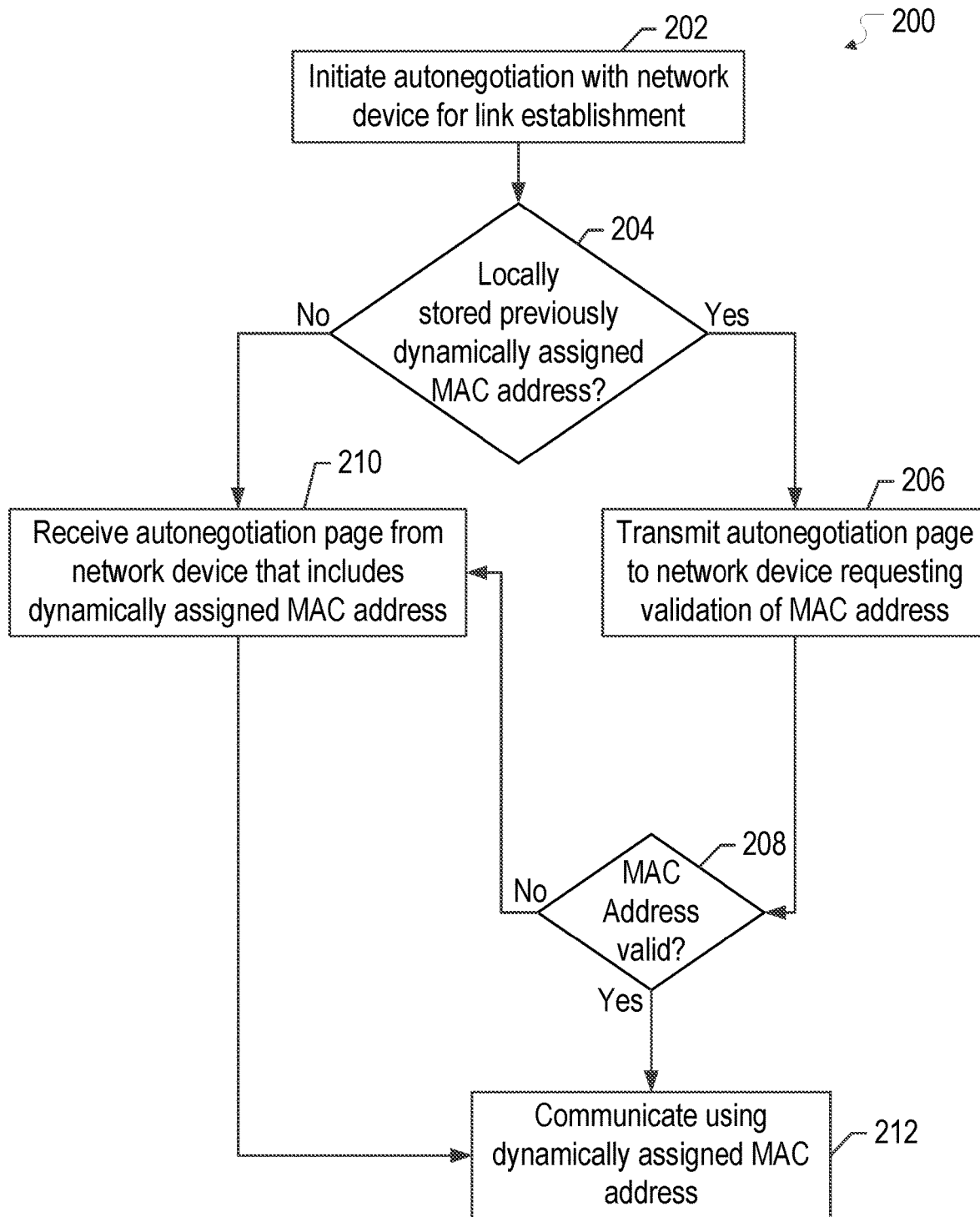
FIG. 2 illustrates a flow diagram of an example process of local dynamic local MAC address assignment in accordance with one or more implementations.

FIG. 2 illustrates a flow diagram of an example process 200 of local dynamic MAC address assignment in accordance with one or more implementations. For explanatory purposes, the example process 200 is primarily described herein with reference to the electronic device 102A and the network device 110A of FIG. 1; however, the example process 200 is not limited to the electronic device 102A and/or the network device 110A of FIG. 1. For example, the example process 200 may be performed by one or more of the electronic devices 102B-H and/or the network device 110B, and the example process 200 may be performed by one or more components of the electronic device 102A and/or the network device 110A. Further for explanatory purposes, the blocks of the example process 200 are described herein as occurring in serial, or linearly. However, multiple blocks of the example process 200 may occur in parallel. In addition, the blocks of the example process 200 need not be performed in the order shown and/or one or more of the blocks of the example process 200 need not be performed.

The electronic device 102A initiates autonegotiation for link establishment with the network device 110A (202). The network device 110A may be and/or may include a switch device that is responsible for the assignment of a block of local MAC addresses. The electronic device 102A determines whether a MAC address that was previously dynamically assigned to it, e.g. by the network device 110A, is stored locally, such as in a flash memory (204). If there is no locally stored MAC address that was previously dynamically assigned (204), the electronic device 102A waits for an autonegotiation page from the network device 110A that includes a MAC address dynamically assigned to the electronic device 102A by the network device 110A (210). For example, the autonegotiation page may be a next page and/or a base page, such as the next page and/or base page defined by Institute of Electrical and Electronics Engineers (IEEE) clause 28 (CL28) and/or clause 73 (CL73), respectively. In one or more implementations, the electronic device 102A may set a bit in a base page to request a dynamic MAC address assignment from the network device 110A.

If the network device 110A does not have an address block available for assignment, the network device 110A may transmit a next page that indicates that there are presently no MAC addresses available for assignment. The network device 110A may repeat the next page until addresses are available, and/or the autonegotiation may be terminated, such as to conserve energy, and restarted at a later time, such as after a wait timer has expired.

In one or more implementations, the network device 110A may transmit a request for a block of addresses to one or more of the servers 120A-C, such as by sending a multicast packet requesting an address block to a distributor multicast address, as is discussed further below with respect to FIG. 3. Alternatively, and/or in addition, the network device 110A may obtain an address block using the process 200. For example, a request, such as a base page, may include two bits that can be set to request address assignment during autonegotiation. One of the bits may be set to indicate that the address requesting device is an end node that needs a single address, such as the electronic device 102A, and the other bit may be set to indicate that the address requesting device, such as the network device 110A, needs an address block for distribution to other devices, such as the electronic devices 102A-C. The response to the request for an address block may include a base address plus a number of consecutive addresses above (and/or below) the base address that are assigned to the network device 110A for distribution.

Thus, a main address distributor, such as one or more of the servers 120A-C, may provide a range of addresses to each device that is directly attached to a port of the main address distributor. Each of the attached devices may keep the addresses it needs for its own ports and distribute the remaining addresses to the devices attached to it, and so on.

Figure 3:
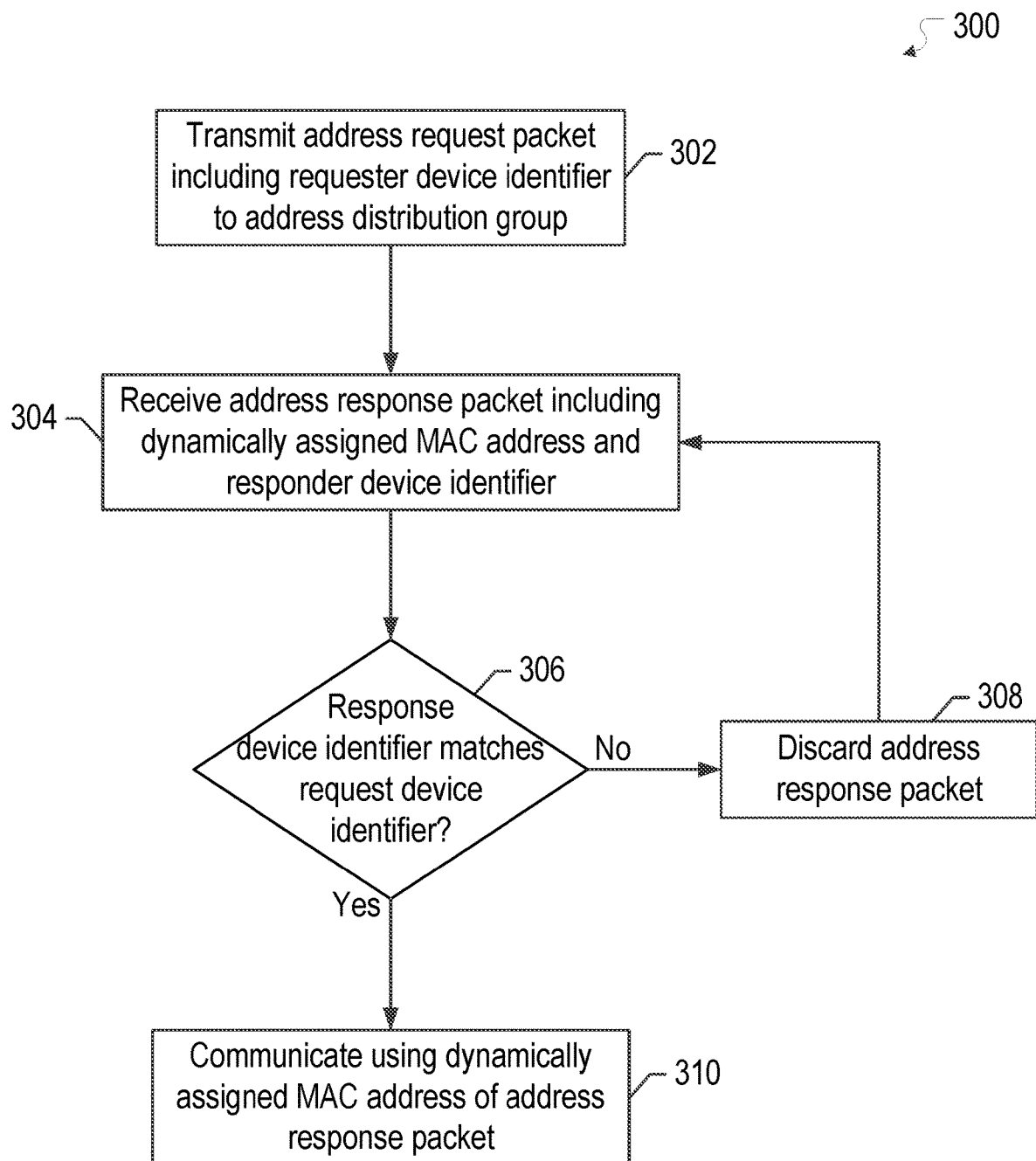
FIG. 3 illustrates a flow diagram of an example process of distributed dynamic local MAC address assignment in accordance with one or more implementations.
Figure 4:
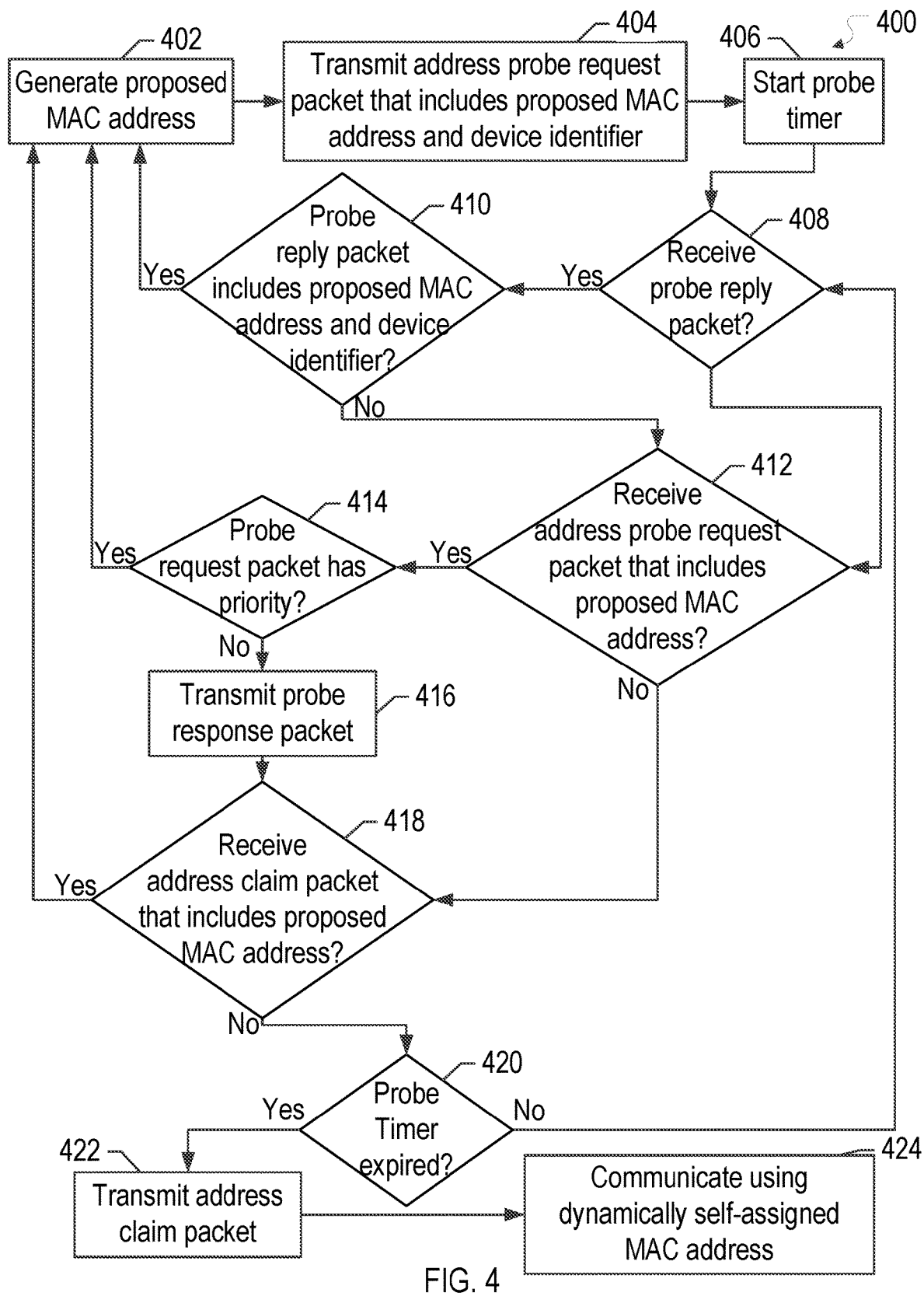
FIG. 4 illustrates a flow diagram of an example process of dynamic local MAC address self-assignment in accordance with one or more implementations.

In one or more implementations, the network device 110A may be configured with a global MAC address, such as at the time of manufacture, and/or the network device 110A may be assigned a MAC address via one or more of the processes discussed with respect to FIGS. 2-4. Alternatively, and/or in addition, the network device 110A may be assigned a certain unicast address by default, such as the same upper 24 bits as the assigned address and all zeros for the lower 24 bits. The network device 110A may locally cache its MAC address assignment and may also cache the MAC addresses that it dynamically assigns to each port, e.g. to each of the electronic devices 102A-C coupled to each port, such that the address assignments can be restored upon a power cycle.

If the electronic device 102A determines that a MAC address that was previously dynamically assigned to it is stored locally (204), the electronic device 102A transmits an autonegotiation page to the network device 110A that includes the stored MAC address and requests for validation (or confirmation) of the stored MAC address (206). If the MAC address that was previously dynamically assigned to the electronic device 102A is still valid, the network device 110A transmits an autonegotiation page indicating the same to the electronic device 102A, and the electronic device 102A communicates, e.g. with the electronic devices 102B-C over the transmission lines 108, and/or over the network 115, using the dynamically assigned MAC address (212).

If the MAC address that was previously dynamically assigned to the electronic device 102A is no longer valid (208), the network device 110A transmits an autonegotiation page indicating the same to the electronic device 102A, and the electronic device 102A waits for a dynamic MAC address assignment from the network device 110A (210).

In one or more implementations, if the electronic device 102A has established a link with the network device 110A, the electronic device 102A may utilize layer type-length-value (TLV) structures of link layer discovery protocol (LLDP) packets to communicate with the network device 110A, e.g. in lieu of autonegotiation pages.

FIG. 3 illustrates a flow diagram of an example process 300 of distributed dynamic MAC address assignment in accordance with one or more implementations For explanatory purposes, the example process 300 is primarily described herein with reference to the electronic device 102A, the network device 110A, and the server 120A of FIG. 1; however, the example process 300 is not limited to the electronic device 102A, the network device 110A, and/or the server 120A of FIG. 1. For example, the example process 300 may be performed by one or more of the electronic devices 102B-H, the network device 110B, and/or the servers 120B-C, and the example process 300 may be performed by one or more components of the electronic device 102A, the network device 110A, and/or the server 120A. Further for explanatory purposes, the blocks of the example process 300 are described herein as occurring in serial, or linearly. However, multiple blocks of the example process 300 may occur in parallel. In addition, the blocks of the example process 300 need not be performed in the order shown and/or one or more of the blocks of the example process 300 need not be performed.

When the electronic device 102A is powered on and/or initialized, the electronic device 102A transmits an address request packet, such as a multicast packet or multicast protocol data unit (PDU), including a device identifier (or port identifier) to an address distribution group (302). In one or more implementations, the electronic device 102A transmits the address request in a type-length-value (TLV) structure of a link layer discovery protocol (LLDP) packet. Since the electronic device 102A does not yet have a dynamically assigned MAC address, the source MAC address of the address request packet may be a null MAC address and/or a well-known, e.g. pre-configured/established/reserved, MAC address that is reserved for address request packets. The null MAC address may not be used as a destination address in the network environment 100. Network devices, such as bridges, that are newly added to the network environment 100 can disable learning the null or pre-configured MAC address when seen as a source address.

The destination MAC address of the address request packet may be a well-known, e.g. pre-configured/established, group MAC address, e.g. a multicast address, that addresses one or more devices configured to distribute MAC addresses, such as the network device 110A and/or one or more of the servers 120A-C, such as the server 120A. The address request packet may include an Ethertype field set to "address distribution," and a subtype field set to "request." The payload may include the device identifier associated with the electronic device 102A. The address request packet may further include a type field associated with the device identifier that indicates the type of the identifier, such as an internet protocol (IP) address, a 64-bit random number, a 64-bit extended unique identifier (EUI), a unique serial number (ICCID), e.g. from a subscriber identity module (SIM) card, and/or any other identifier value, such as values allowed for device identifiers in IEE 802.1AB-2009 (e.g. table 8-3). The payload of the address request packet may also include a previously dynamically assigned MAC address, if any, when the type identifier isn't a random number. In this manner, the previously assigned MAC address may be reassigned to the electronic device 102A when no conflicts exist, e.g. when still valid.

An address distributor, such as the network device 110A and/or the server 120A, receives the address request packet and responds with an address response packet that is then received by the electronic device 102A (304). The source MAC address of the address response packet is the MAC address of the address distributor, such as the network device 110A and/or the server 120A. Since the electronic device 102A does not have a MAC address assigned yet, the destination address of the address response packet is a well-known, e.g. pre-configured/established, group MAC address, such as a multicast address, that is reserved for address response packets that are received by all devices requesting MAC addresses, such as the electronic device 102A and any other devices requesting a MAC address. The address response packet may include an Ethertype field that is set to "address distribution," and may include a subtype field that is set to "response." The payload of the address response packet includes a MAC address assignment and a device identifier corresponding to the device to which the address distributor has assigned the MAC address.

The electronic device 102A checks the device identifier of the address response packet. If the device identifier of the address response packet does not match the device identifier of the electronic device 102A (306), the electronic device 102A discards the address response packet (308) and continues to listen for another address response packet (304). If the device identifier of the address response packet matches the device identifier associated with the electronic device 102A (306), the electronic device 102A starts communicating using the dynamically assigned MAC address of the address response packet (310).

In one or more implementations, instead of addressing the address request packet to a group MAC address, the electronic device 102A may address the address request packet to the nearest network device, e.g. the nearest bridge device, such as the network device 110A. Thus, the address response packet may include the MAC address of the network device 110A as the destination address. Although the device identifier may not be needed for point-to-point links, its use may allow for multi-point or point to multi-point links, such as Ethernet passive optical network (EPON) or wireless port to access point. Since in this instance the address request packets are received by the port of the network device 110A, and do not pass through to other network devices, such as bridge relays, the other network devices may not try to learn the null or reserved MAC address used in the address request packets. The network device 110A may obtain a block of MAC addresses for distribution, such as from the server 120A, and may transmit an address response packet assigning one of the MAC addresses to the electronic device 102A.

FIG. 4 illustrates a flow diagram of an example process 400 of dynamic MAC address self-assignment in accordance with one or more implementations. For explanatory purposes, the example process 400 is primarily described herein with reference to the electronic device 102A of FIG. 1; however, the example process 400 is not limited to the electronic device 102A of FIG. 1. For example, the example process 400 may be performed by one or more of the electronic devices 102B-H and/or one or more of the network devices 110A-B, and the example process 400 may be performed by one or more components of the electronic device 102A. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed.

The electronic device 102A generates a proposed MAC address (402). For example, the electronic device 102A may generate the proposed MAC address such that the upper 24-bits are a fixed value, e.g. a pre-configured/established value, and the lower 24-bits are a random value. If the electronic device 102A has a locally stored MAC address that was previously dynamically assigned, the electronic device 102A may use the locally stored MAC address as the proposed MAC address.

The electronic device 102A then transmits an address probe request packet that has a payload containing the proposed MAC address and a device identifier of the electronic device 102A (404) and starts a probe timer (406). The address probe request packet may use a null MAC address (or a reserved MAC address) as the source address and the destination address may be an address claim group address. The address claim group address may be, for example, a multicast address and/or a broadcast address that is addressed to one or more of the electronic devices 102A-H and/or the network devices 110A-B. An Ethertype field of the address probe request packet may be set to "address claim" and a subtype field of the address probe request packet may be set to "probe request." The electronic device 102A may transmit the address probe request packet a number of times, such as three times, with a wait time between transmissions to allow for packet loss.

If another of the electronic devices 102B-H, such as the electronic device 102B, has already claimed the proposed MAC address and receives the probe request packet, the electronic device 102B responds with a probe reply packet that has a payload including the proposed MAC address and the device identifier of the electronic device 102A, which indicates that the proposed MAC address has already been claimed and is in use by another device. The probe reply packet may include the proposed MAC address as the source address if the proposed MAC address is already taken; otherwise, the probe reply packet may include a null (or reserved) MAC address as the source address. The destination address of the probe reply packet may be the address claim group address. The probe reply packet may include an Ethertype field set to "address claim" and a subtype field set to "probe reply."

If the electronic device 102A receives a probe reply packet, such as from the electronic device 102B (408), the electronic device 102A determines whether the probe reply packet includes the MAC address proposed by the electronic device 102A and the device identifier of the electronic device 102A (410). If the probe reply packet includes the proposed MAC address and the device identifier of the electronic device 102A (410), the electronic device 102A generates another proposed MAC address (402) and repeats (404)-(408).

If the electronic device 102A does not receive a probe reply packet (408) or if the probe reply packet does not include the proposed MAC address and device identifier of the electronic device 102A (410), the electronic device 102A determines whether an address probe request packet is received that includes the MAC address proposed by the electronic device 102A, such as from the electronic device 102B (412). If the electronic device 102A receives an address probe request packet that includes the MAC address proposed by the electronic device 102A (412), the electronic device 102A determines whether the device that transmitted the probe request packet, such as the electronic device 102B has priority over the electronic device 102A (414). For example, the electronic device 102A may compare its device identifier type concatenated with its device identifier to the device identifier type of the probe request packet concatenated with the device identifier of the probe request packet. If the concatenated device identifier type and device identifier of the electronic device 102A is less than, e.g. numerically less than, the concatenated device identifier type and device identifier of the probe request, then the electronic device 102A does not have priority (414) and the electronic device 102A generates another proposed MAC address and repeats (404)-(412).

If the concatenated device identifier type and device identifier of the electronic device 102A is greater than, e.g. numerically, the concatenated device identifier type and device identifier of the probe request, then the electronic device 102A has priority (414) and the electronic device 102A transmits a probe response packet that contains the device identifier and MAC address of the probe request packet (416), thereby notifying the electronic device 102B that it should generate a different MAC address. In one or more implementations, the address probe request packet may include a priority field that indicates the priority of the device transmitting the address probe request packet.

The electronic device 102A then determines whether an address claim packet has been received that includes the MAC address proposed by the electronic device 102A (418). If the electronic device 102A receives an address claim packet that includes the MAC address proposed by the electronic device 102A (418), the electronic device 102A generates another proposed MAC address (402) and repeats (404)-(418). If the electronic device 102A does not receive an address claim packet that includes the MAC address proposed by the electronic device 102A (418), the electronic device 102A determines whether the probe timer has expired, or reached a timeout value (420). The probe timer is set to allot sufficient time for the other electronic devices 102B-H to transmit a probe response packet, if necessary.

If the probe timer has not expired or reached a timeout value (420), the electronic device 102A continues performing (408)-(420). If the probe timer has expired or reached a timeout value (420), the electronic device 102A transmits an address claim packet (422) indicating that the electronic device 102A has claimed the proposed MAC address. The address claim packet may include a source address set to a null (or reserved) MAC address, a destination address set to the address claim group address, an Ethertype field set to "address claim," a subtype field set to "claim," and a payload that includes the device identifier of the electronic device 102A and the local MAC address proposed and claimed by the electronic device 102A. The electronic device 102A then starts communicating using the proposed and claimed (e.g. self-assigned) MAC address (424). Accordingly, the electronic device 102A can claim a MAC address without facilitation from the servers 120A-C and/or the network devices 110A-B. The electronic device 102A continues to listen for address probe requests for its claimed MAC address. If such an address probe request is received, the electronic device 102A transmits an appropriate address probe reply and/or address claim packet.

In one or more implementations, the electronic device 102A may periodically transmit and/or receive address beacon packets, which may be used to detect any MAC address conflicts that might arise. An address beacon packet may have a source address set to a null (or reserved) MAC address, a destination address set to the address claim group address, an Ethertype field set to "address claim," a subtype field set to "beacon," and a payload that includes a device identifier and MAC address, e.g. of the device transmitting the address beacon packet.

If the electronic device 102A receives an address beacon packet that includes the MAC address claimed by the electronic device 102A, the electronic device 102A checks whether it has priority over the device transmitting the address beacon, e.g. as discussed above (414). If the electronic device 102A has priority, the electronic device 102A transmits an address beacon packet to indicate that it has claimed the MAC address so that the other device will stop using the MAC address (e.g. after determining that the electronic device 102A has priority in the manner discussed above (414)). If the electronic device 102A does not have priority, the electronic device 102A stops operation and generates another proposed MAC address (402).

In one or more implementations, a server (in an adjacent bridge and/or a central server), such as the server 120A, may listen on the address claim group address to receive the address probe packets, the probe reply packets, the address claim packets, etc. When the server 120A receives an address probe packet, the server 120A may respond with a packet indicating that there is an address server and may provide a MAC address to the probing device. Alternatively, or in addition, the server 120A may keep a record of all probed and claimed MAC addresses and may respond with a message to assign an alternate address when the server 120A identifies that a probed address conflicts with an already claimed or probed address.

In one or more implementations, the network device 110A may operate as a relay between the electronic device 102A and one or more of the servers 120A-C, such as the server 120A. For example, the network device 110A may encapsulate an address request packet received from the electronic device 102A into a relay PDU with the source address set to the MAC address of the network device 110A and may transmit the relay PDU to the server 120A. The encapsulation may include a device identifier of the network device 110A and/or the electronic device 102A. The server 120A may transmit an address response packet to the network device 110A which then relays the response to the address claim group address, from which it can be received by the electronic device 102A. The network device 110A may use the device identifier to choose the output port for the relayed message, e.g. to send the relayed message directly to the electronic device 102A, thereby reducing multicast traffic.

Figure 5:
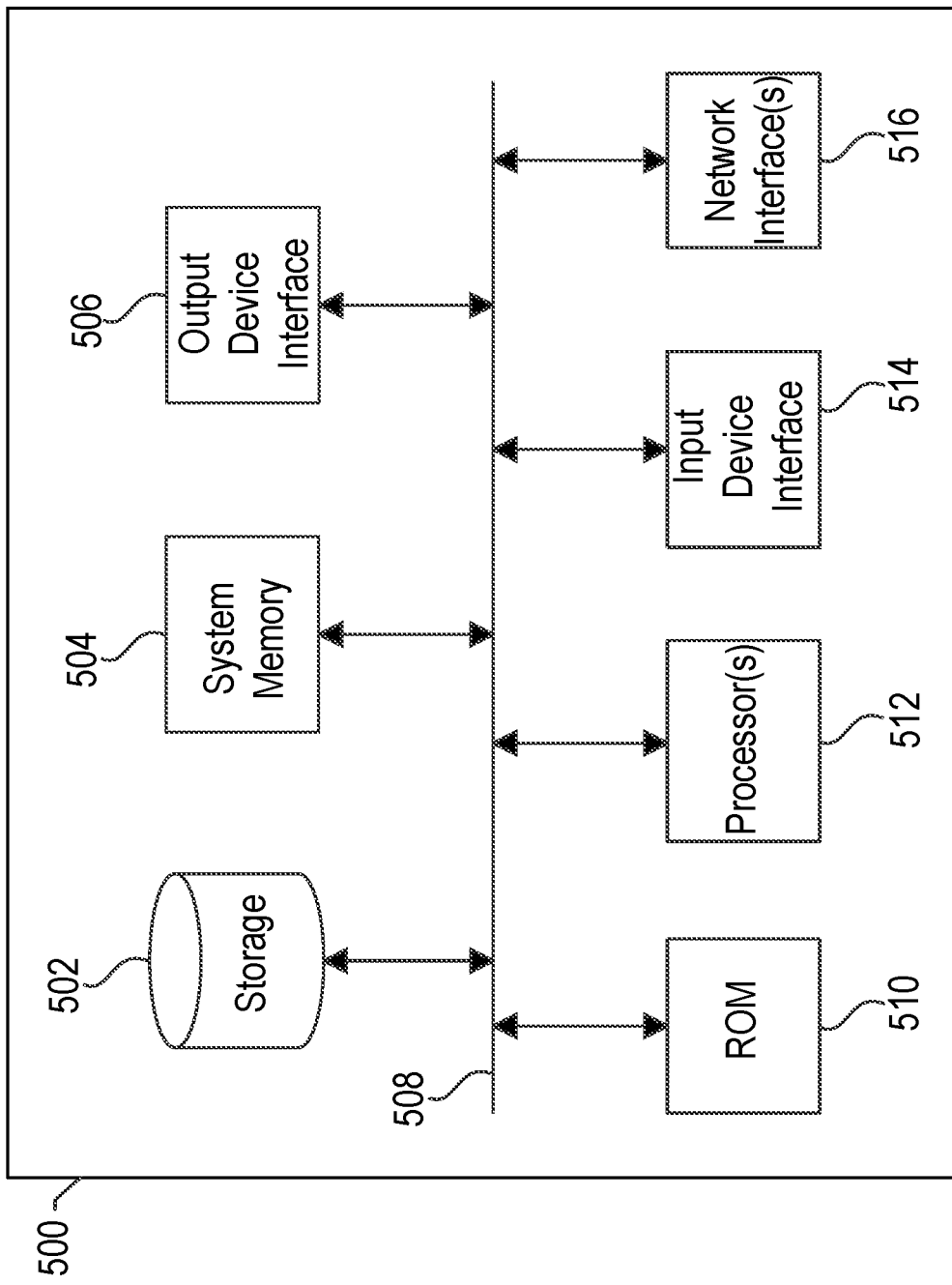
FIG. 5 conceptually illustrates an electronic system with which one or more implementations of the subject technology may be implemented.

FIG. 5 conceptually illustrates an electronic system 500 with which one or more implementations of the subject technology may be implemented. The electronic system 500, for example, may be, or may be coupled to, a powertrain system, a chassis system, a telematics system, an entertainment system, a camera system, a sensor system, such as a lane departure system, a diagnostics system, a gateway device, a set-top box, a desktop computer, a laptop computer, a tablet computer, a server, a switch, a router, a base station, a receiver, a phone, a wearable device, or generally any electronic device that transmits signals, e.g. over a network. The electronic system 500 can be, and/or can be a part of, one or more of the electronic devices 102A-H, one or more of the network devices 110A-B, and/or one or more of the servers 120A-C. Such an electronic system 500 includes various types of computer readable media and interfaces for various other types of computer readable media. The electronic system 500 includes a bus 508, one or more processor(s) 512, a system memory 504 or buffer, a read-only memory (ROM) 510, a permanent storage device 502, an input device interface 514, an output device interface 506, and one or more network interface(s) 516, or subsets and variations thereof.

The bus 508 collectively represents all system, peripheral, and chipset buses that communicatively connect the numerous internal devices of the electronic system 500. In one or more implementations, the bus 508 communicatively connects the one or more processor(s) 512 with the ROM 510, the system memory 504, and the permanent storage device 502. From these various memory units, the one or more processor(s) 512 retrieve instructions to execute and data to process in order to execute the processes of the subject disclosure. The one or more processor(s) 512 can be a single processor or a multi-core processor in different implementations.

The ROM 510 stores static data and instructions that are needed by the one or more processor(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processor(s) 512 may need at runtime. In one or more implementations, the processes of the subject disclosure are stored in the system memory 504, the permanent storage device 502, and/or the ROM 510. From these various memory units, the one or more processor(s) 512 retrieve instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by the electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 5, the bus 508 also couples the electronic system 500 to one or more networks (not shown), and/or one or more of the electronic devices 102A-D, through one or more network interface(s) 516. One or more network interface(s) may include an Ethernet interface, a WiFi interface, a Bluetooth interface, a cellular interface, a power line interface, a multimedia over coax alliance (MoCA) interface, a reduced gigabit media independent interface (RGMII), or generally any interface for connecting to a network. The one or more network interfaces 516 may include, or may be coupled to, a physical layer module. In this manner, the electronic system 500 can be a part of one or more networks of computers (such as a local area network ("LAN"), a wide area network ("WAN"), or an Intranet, or a network of networks, such as the Internet. Any or all components of the electronic system 500 can be used in conjunction with the subject disclosure. In one or more implementations, one or more of the components of the electronic system 500 may not be present, such as one or more of the output device interface 506, the input device interface 514, the storage device 502, other non-volatile storage devices, and/or any of the other components of the electronic system 500.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), and/or various components and blocks may not be present in one or more implementations, all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A non-transitory computer-readable medium comprising code that, when executed by one or more processors, causes the one or more processors to perform operations, and the code comprising:
    code to transmit a media access control (MAC) address request packet comprising a first device identifier and addressed to a first multicast address;
    code to receive one or more MAC address response packets each comprising a second device identifier and a dynamically assigned MAC address, the one or more MAC address response packets being addressed to a broadcast address that is separate from the second device identifier and the dynamically assigned MAC address;
    code to determine, for each of the one or more MAC address response packets, whether the second device identifier matches the first device identifier;
    code to discard the one or more MAC address response packets when the second device identifier does not match the first device identifier; and
    code to communicate using the dynamically assigned MAC address from one of the one or more MAC address response packets for which the second device identifier matches the first device identifier.

2. The non-transitory computer-readable medium of claim 1, wherein the first multicast address is associated with one or more address distributing devices and the one or more MAC address response packets are received from the one or more address distributing devices.

3. The non-transitory computer-readable medium of claim 1, wherein the dynamically assigned MAC address comprises a locally unique MAC address.

4. The non-transitory computer-readable medium of claim 1, wherein a source address of the MAC address request packet is set to a reserved MAC address that is not assigned to any device.

5. The non-transitory computer-readable medium of claim 1, wherein the first device identifier comprises at least one of an internet protocol (IP) address, a random number, or an extended unique identifier.

6. The non-transitory computer-readable medium of claim 1, wherein the dynamically assigned MAC address is generated from a 24-bit random value and a pre-configured 24-bit value, wherein the 24-bit random value comprises least significant bits of the dynamically assigned MAC address and the pre-configured 24-bit value comprises most significant bits of the dynamically assigned MAC address.

7. The non-transitory computer-readable medium of claim 1, wherein the MAC address request packet is transmitted via an autonegotiation page.

8. The non-transitory computer-readable medium of claim 7, wherein the one or more MAC address response packets are received via one or more other autonegotiation pages.

9. The non-transitory computer-readable medium of claim 8, wherein the autonegotiation page and the one or more other autonegotiation pages each comprises at least one of a base page or a next page.

10. A method comprising:
    transmitting a media access control (MAC) address request packet comprising a first device identifier and addressed to a first multicast address;
    receiving one or more MAC address response packets each comprising a second device identifier and a dynamically assigned MAC address, the one or more MAC address response packets being addressed to a broadcast address that is separate from the second device identifier and the dynamically assigned MAC address;
    determining, for each of the one or more MAC address response packets, whether the second device identifier matches the first device identifier;
    discarding the one or more MAC address response packets when the second device identifier does not match the first device identifier; and
    communicating using the dynamically assigned MAC address from one of the one or more MAC address response packets for which the second device identifier matches the first device identifier.

11. The method of claim 10, wherein the first multicast address is associated with one or more address distributing devices and the one or more MAC address response packets are received from the one or more address distributing devices.

12. The method of claim 10, wherein the dynamically assigned MAC address comprises a locally unique MAC address.

13. The method of claim 10, wherein a source address of the MAC address request packet is set to a reserved MAC address that is not assigned to any device.

14. The method of claim 10, wherein the first device identifier comprises at least one of an internet protocol (IP) address, a random number, or an extended unique identifier.

15. The method of claim 10, wherein the dynamically assigned MAC address is generated from a 24-bit random value and a pre-configured 24-bit value, wherein the 24-bit random value comprises least significant bits of the dynamically assigned MAC address and the pre-configured 24-bit value comprises most significant bits of the dynamically assigned MAC address.

16. A semiconductor device comprising:
    processing circuitry configured to:
    transmit a media access control (MAC) address request packet comprising a first device identifier and addressed to a first multicast address;
    receive one or more MAC address response packets each comprising a second device identifier and a dynamically assigned MAC address, the one or more MAC address response packets being addressed to a broadcast address that is separate from the second device identifier and the dynamically assigned MAC address;
    determine, for each of the one or more MAC address response packets, whether the second device identifier matches the first device identifier;
    discard the one or more MAC address response packets when the second device identifier does not match the first device identifier; and
    communicate using the dynamically assigned MAC address from one of the one or more MAC address response packets for which the second device identifier matches the first device identifier.

17. The semiconductor device of claim 16, wherein the first multicast address is associated with one or more address distributing devices and the one or more MAC address response packets are received from the one or more address distributing devices.

18. The semiconductor device of claim 16, wherein the dynamically assigned MAC address comprises a locally unique MAC address.

19. The semiconductor device of claim 16, wherein a source address of the MAC address request packet is set to a reserved MAC address that is not assigned to any device.

20. The semiconductor device of claim 16, wherein the first device identifier comprises at least one of an internet protocol (IP) address, a random number, or an extended unique identifier.

\* \* \* \* \*